United States Patent [19]

Mori

[11] Patent Number: 4,984,150
[45] Date of Patent: Jan. 8, 1991

[54] VIRTUAL MEMORY CONTROL MANAGEMENT SYSTEM

[75] Inventor: Ryoya Mori, Tokyo, Japan

[73] Assignee: Kabushiki Kaisha Toshiba, Kawasaki, Japan

[21] Appl. No.: 248,842

[22] Filed: Sep. 26, 1988

[30] Foreign Application Priority Data

Sep. 29, 1987 [JP] Japan .................................. 62-245427

[51] Int. Cl.$^5$ ............................................. G06F 12/08
[52] U.S. Cl. .................................. 364/200; 364/256.3; 364/254.3
[58] Field of Search .............................. 364/200, 900

[56] References Cited

U.S. PATENT DOCUMENTS 3,854,126 12/1974 Gray et al. ........................ 364/200

OTHER PUBLICATIONS

Cesa et al., "Least-Recently-Used Methodologies within EDAM", IBM Tech. Discl., vol. 23, No. 11B, Apr. 1982, pp. 5981-5984.

Primary Examiner—Thomas M. Heckler
Attorney, Agent, or Firm—Finnegan, Henderson, Farabow, Garrett and Dunner

[57] ABSTRACT

Working sets, each of which is specific to a code section, a data section, and a stack of a task are arranged in a memory. Page-in and page-out processing sections are arranged in the working sets. A determination section determines a code section virtual space, data section virtual space, or stack virtual space to which a virtual page causing a page fault belongs, and supplies a page-in request to one of the page-in processing sections corresponding to the working sets. When the corresponding working set is not full, the page-in processing section reads in the virtual page causing the page fault in the working set. When the working set is full, the page-in processing section supplies a page-out request to a page-out processing section.

5 Claims, 5 Drawing Sheets

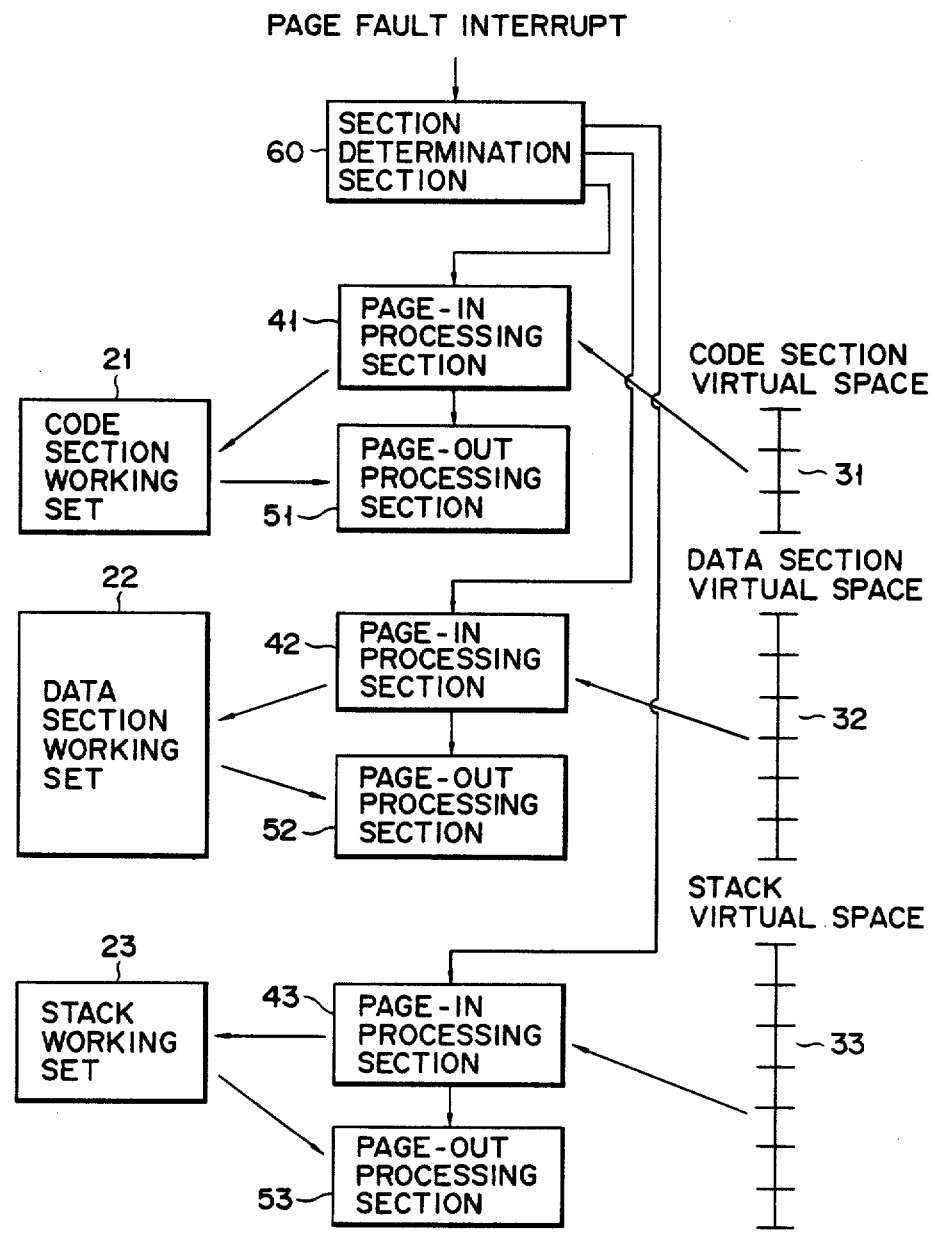
F I G. 3

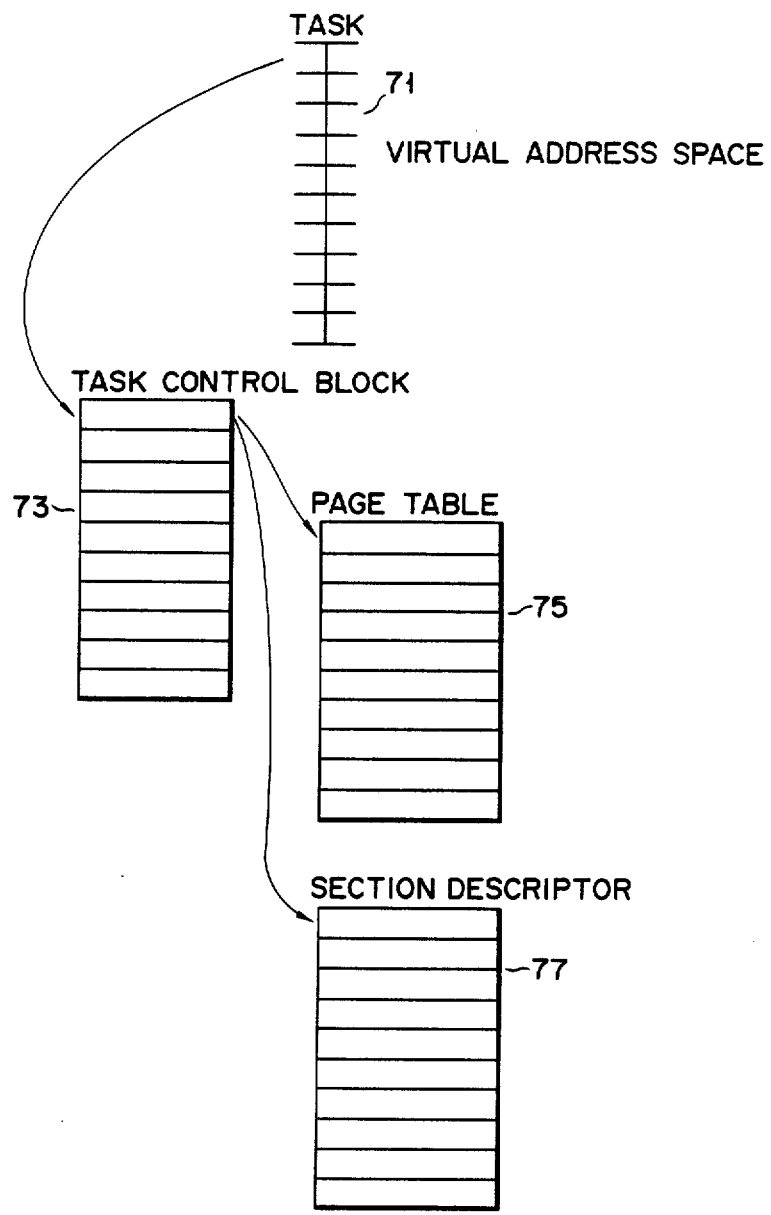
F I G. 4

VIRTUAL MEMORY CONTROL MANAGEMENT SYSTEM

BACKGROUND OF THE INVENTION

1. Field of the Invention

The present invention relates to a virtual memory control management system for performing demand paging and, more particularly, to a virtual memory control management system for registering a virtual page to which a real page is allocated to execute a task.

2. Description of the Related Art

As shown in FIG. 1, a conventional system of this type includes working set 10 for each execution unit called a task (or a process) to register (page-in) a virtual page which is necessary during execution in this working set, and allocates a real page to the virtual page. This system is based on the assumption that a program has a locality. However, in virtual spaces which are necessary for the program executed as one task, the locality may or may not be present in accordance with the utilization form of virtual pages. That is, in many cases, as shown in FIG. 2, in sections including a code section, a data section, a stack, and the like, although the code section has a locality, the data section has no locality. Therefore, as shown in FIG. 1, when the task is executed using virtual pages of code section, data section, or stack virtual space 11, 12, or 13, the number of page-in operations of virtual pages in data section virtual space 12 is greatly increased. As a result, the virtual pages of the code section having a locality are flashed (page-out) from working set 10 due mainly to a nonlocality of the data section, thus degrading execution speed of the programs.

SUMMARY OF THE INVENTION

It is an object of the present invention to provide a virtual memory control management system in which page-in and page-out processing of a section having poor locality does not adversely affect a section having a locality, thus improving execution speed.

In order to achieve the above object, the virtual memory control management system having a demand paging function of the present invention comprises a plurality of working sets each arranged for each task and each section distinguished in accordance with a utilization form of virtual pages. Each working set registers virtual pages to which real pages are allocated. When a page fault occurs, a section determination section determines a section of an operating task to which a virtual page causing the page fault belongs (a code section, a data section, or a stack). A page-in processing section registers the virtual page causing the page fault in a working set corresponding to the section of the operating task determined by the section determination section. When a working set serving as an object to be processed by the page-in processing section is full, a page-out processing section selects one of the virtual pages which are already registered in this working set and cancels a registration of the selected page.

According to the virtual memory control management system of the present invention, since page-in and page-out processing can be executed in each section, the page-in and page-out processing of a section having poor locality may not adversely affect a section having a locality.

BRIEF DESCRIPTION OF THE DRAWINGS

Other objects and features of the present invention will be apparent from the following description taken in connection with the accompanying drawings in which:

FIG. 3 is a block diagram showing the working set memory management system according to an embodiment of the present invention;

FIG. 4 is a view showing details of a section determination section in FIG. 3.

DETAILED DESCRIPTION OF THE PREFERRED EMBODIMENT

Figure 1:
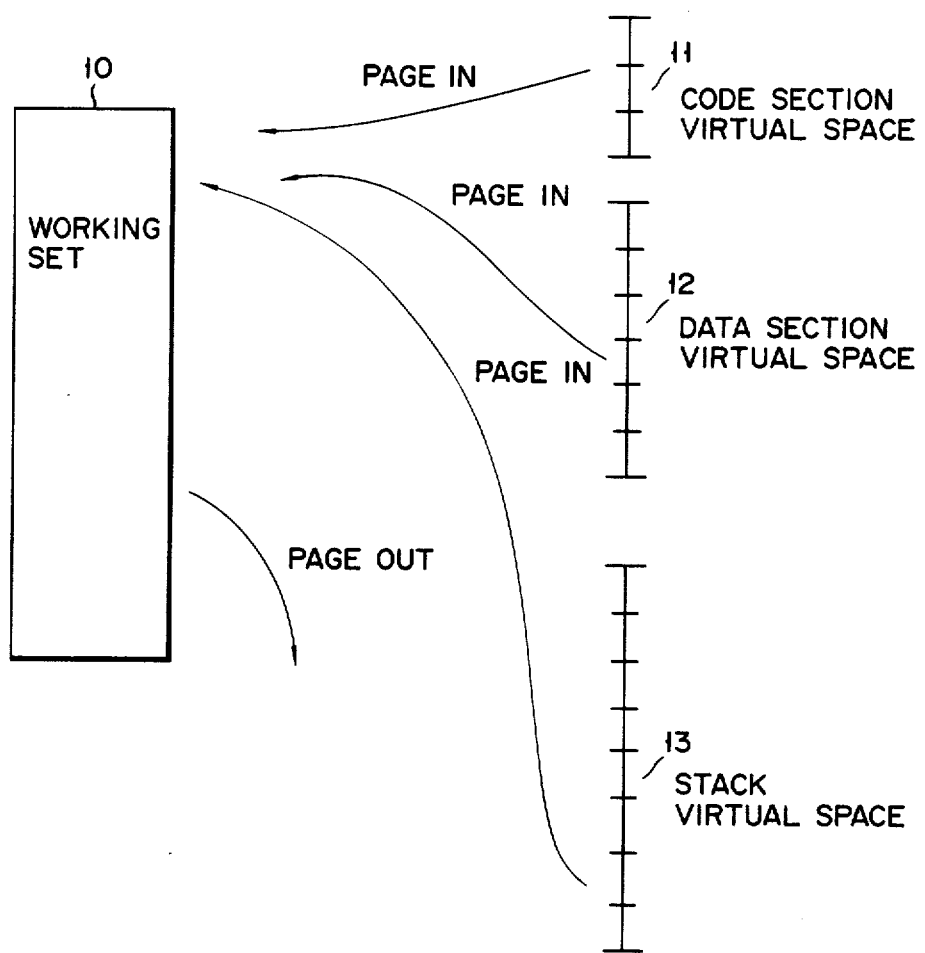
FIG. 1 is a view explaining a locality of a virtual space of a task at each of a code section, a data section, and a stack.
Figure 2:
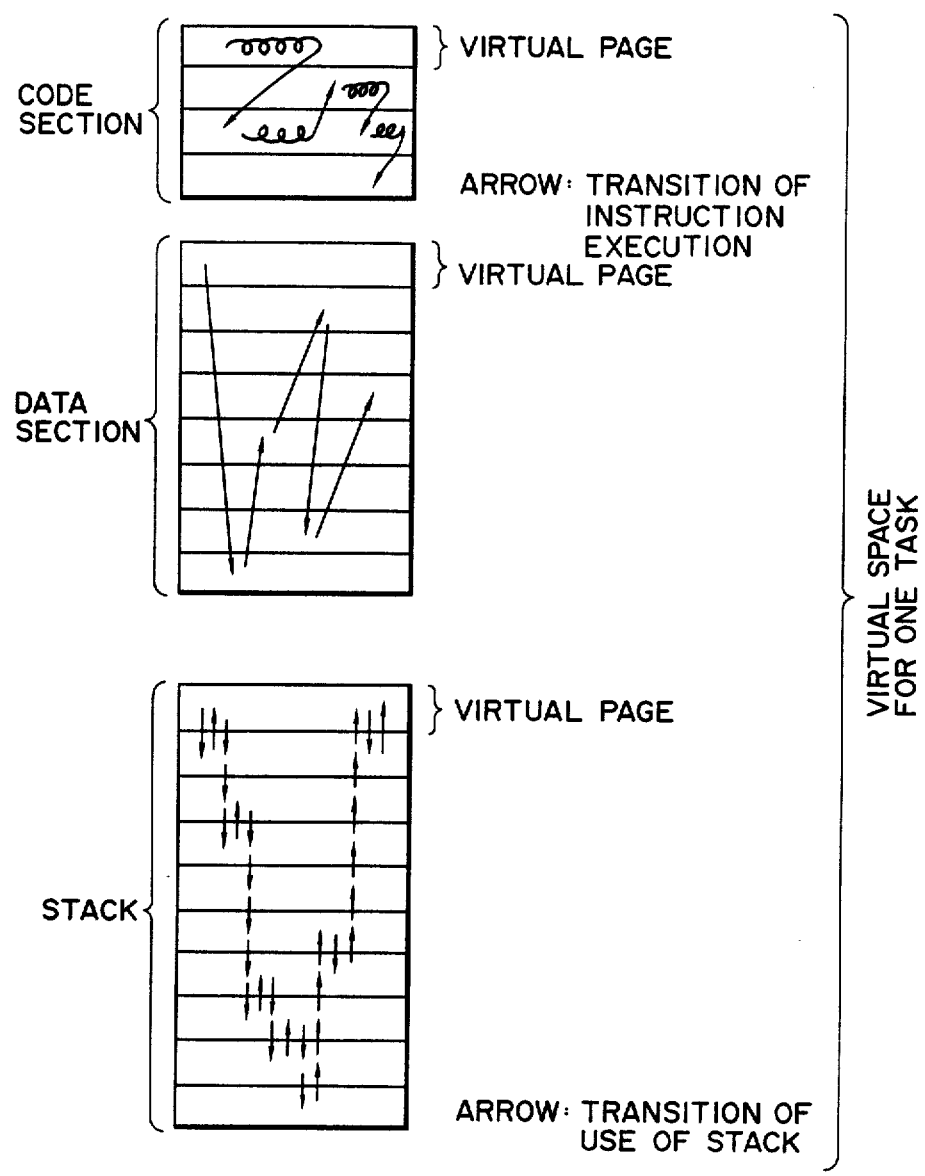
FIG. 2 is a block diagram showing an arrangement of a conventional working set memory management system.
Figure 5:
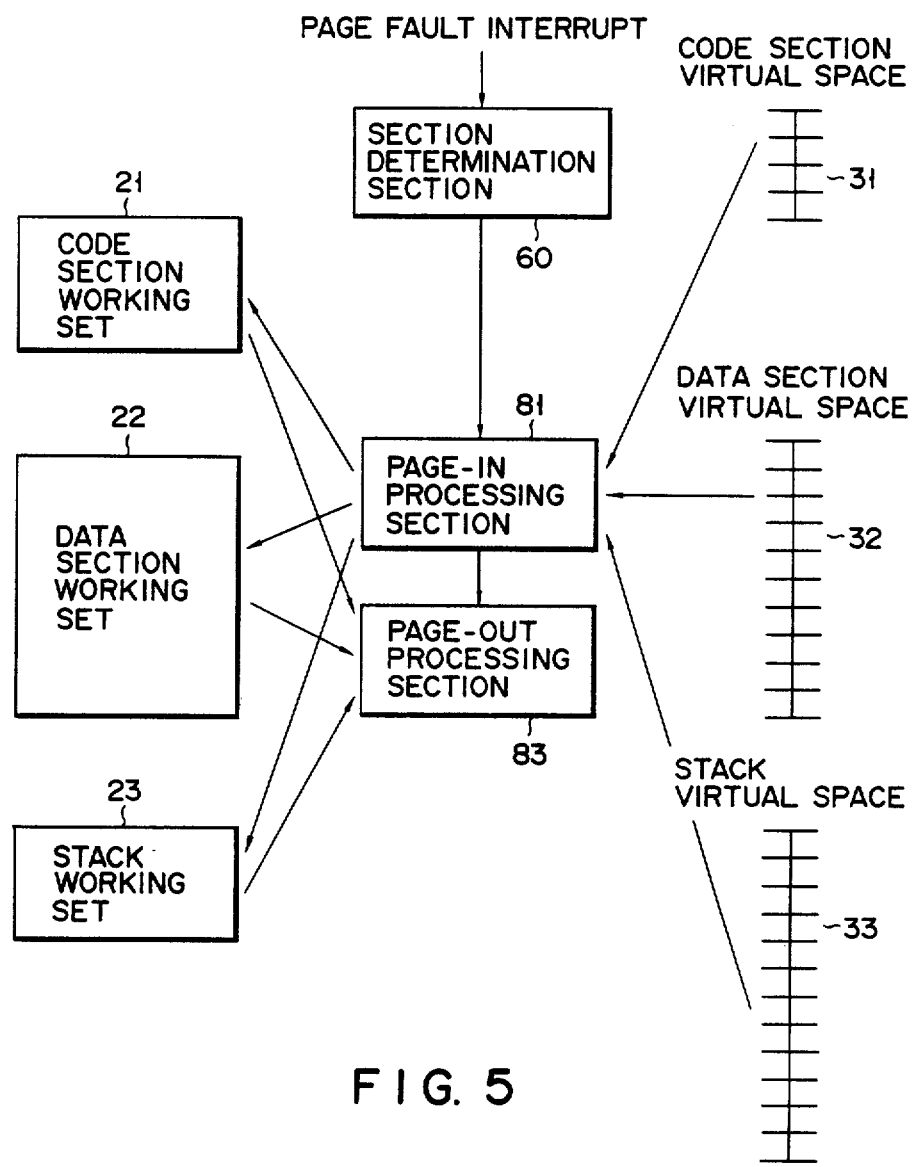
FIG. 5 is a view showing a modification of the embodiment shown in FIG. 3.

FIG. 3 is a block diagram of a virtual memory control management system according to an embodiment of the present invention. In this embodiment, working sets consist of working set (code section working set) 21 which is specific to a code section of a given task, working set (data section working set) 22 which is specific to a data section of the task, and working set (stack working set) 23 which is specific to a stack of the task. A total number of virtual pages that can be paged-in (registered) in working sets 21 to 23 coincides with the number of virtual pages to which real pages can be allocated to execute the above task. A virtual space used in the above task includes code section virtual space 31 used for the code section of the task, data section virtual space 32 used for the data section of the task, and stack virtual space 33 used for the stack of the task. Page-in processing sections 41, 42, and 43 page-in the virtual pages of code section, data section, and stack virtual spaces 31, 32, and 33 in code section, data section, and stack working sets 21, 22, and 23, respectively. Page-out processing sections 51, 52, and 53 perform page-out processing from working sets 21, 22, and 23 in response to the requests from page-in processing sections 41, 42, and 43, respectively. Section determination section 60 is connected to page-in processing sections 41, 42, and 43. Section determination section 60 receives page-fault interrupt detected by hardware, and determines code section, data section, or stack virtual space 31, 32, or 33 to which the virtual page causing the page fault, i.e., the virtual page to be paged-in belongs. The determination by this section determination section 60 is performed as follows. As shown in FIG. 4, assume that one virtual address space is divided into ten sections. Task control block 73, page table 75, and section descriptor 77 are arranged for this virtual address space 71. Page table 75 is a table for converting a virtual address into a real page. Section descriptor 77 is a table for storing an attribute of each section. An address pointer for accessing page table 75 and section descriptor 77 is stored in task control block 73. Information representing a code section, data section, or stack virtual space to which each section belongs is stored in this section descriptor 77. Therefore, when a page fault occurs, by referring to section descriptor 77, section determination section 60 can determine code section, data section, or stack virtual space 31, 32, or 33 to which the virtual page to be paged-in belongs. Section determination section 60 determines any one of working sets 21 to 23 to be paged-in, and supplies a page-in request to a corresponding one of page-in processing sections 41 to 43.

An operation of the virtual memory control management system of the present invention will be described hereinafter.

Assume that, since a real page is not allocated to a virtual page accessed upon execution of a given task, a page fault occurs and a page-fault interrupt is generated. When section determination section 60 receives the page-fault interrupt, by referring to section descriptor 77, section 60 determines code section, data section, or stack virtual space 31, 32, or 33 to which a virtual page causing the page fault belongs. Section 60 supplies a page-in request to one of page-in processing sections 41 to 43 in accordance with the result of the determination. More specifically, when the virtual page causing the page fault belongs to code section virtual space 31, section determination section 60 supplies a page-in request for code section working set 21 to page-in processing section 41. When the virtual page belongs to data section virtual space 32, section 60 supplies a page-in request for data section working set 22 to page-in processing section 42. When the virtual page belongs to stack virtual space 33, section 60 supplies a page-in request for stack working set 23 to page-in processing section 43.

When page-in processing sections 41 to 43 receive the page-in requests from section determination section 60, if corresponding working sets 21 to 23 are not full, the virtual page causing the page fault is paged-in in working sets 21 to 23, and the real page is allocated to the virtual page, respectively. On the contrary, if corresponding working sets 21 to 23 are full, page-in processing sections 41 to 43 supply page-out requests to page-out processing sections 51 to 53 upon page-in, respectively. Therefore, page-out processing sections 51 to 53 read-out arbitrary virtual pages which are already registered from working sets 21 to 23, respectively, by a selection algorithm such as an LRU (Least Recently Used).

In this embodiment as described above, when the virtual page causing the page fault belongs to code section virtual space 31, the virtual page (code section virtual page) is paged-in in code section working set 21. When the virtual page belongs to data section virtual space 32, the virtual page (data section virtual page) is paged-in in data section working set 22, and when the virtual page belongs to stack virtual space 33, the virtual page (stack virtual page) is paged-in in stack working set 23. At this time, the page-out processing is performed on the working set that is specific to the section to which the virtual page to be paged-in belongs. Therefore, even if a page which is accessed in a wide range and which has been accessed before has no locality, e.g., as in data section virtual space 32, the accessed data section virtual page is paged-in in only data section working set 22. Because the virtual page flashed at this time is a page of only the data section, the virtual pages of sections except the data section which performed page-in at this time, e.g., a virtual page of the code section having a locality will not be flashed. Therefore, high efficiency of the page-in and page-out processing of the code section can be realized, thus improving the execution speed of the programs. In addition, generation of thrashing can be prevented.

In stack virtual space 33, locality changes in accordance with program execution, and the accessed virtual page is paged-in in stack working set 23. For this reason, the LRU is optimum for a selection algorithm of the page-out for working set 23. However, other selection algorithms, e.g., "First In First Out" and "Least Frequently Used (LFU)" can be used. However, in this embodiment, when it is apparent that the stack is compressed after it is elongated, a page-out selection algorithm for flashing from a virtual page which becomes unnecessary by the compression is applied so that execution speed of the program may be improved. In addition, in this embodiment, a flashing section (not shown) is prepared. When a program enters a new phase, the flashing section flashes code section working set 21. When a table to be accessed is switched, the flashing section flashes data section working set 22. In other words, the flashing section simultaneously flashes all the virtual pages paged-in in the corresponding working sets.

In the above embodiment, although the case wherein a working set which is necessary for one task is divided into three sections, i.e., the code and data sections, and the stack is described above, the present invention is not limited thereto. For example, the working set of the stack can be divided into two working sets, i.e., a working set for a control stack, and a working set for a data stack. Thus, the working set can be divided in accordance with the utilization form.

In an embodiment shown in FIG. 3, page-in processing sections 41, 42, and 43, and page-out processing sections 51, 52, and 53 are arranged for code section, data section, and stack working sets 21, 22, and 23. However, as shown in FIG. 4, page-in and page-out processing sections 81 and 83 may be commonly arranged for code section, data section, and stack working sets 21, 22, and 23.

What is claimed is:

1. A virtual memory control management system having a demand paging function, comprising:
    a plurality of working set means, each provided for respective ones of a plurality of program sections that constitute a task, for registering virtual pages to which real pages are allocated, the sections being distinguished in accordance with how the sections are used by the task;
    determining means for receiving an externally supplied page fault caused by a virtual page and for determining a section of a task being executed to which the virtual page causing the page fault is allocated;
    page-in means for performing page-in processing for registering the virtual page causing the page fault in said working set means corresponding to the section of the task being executed determined by said determining means; and
    page-out means for selecting one of the virtual pages registered in the working set means corresponding to the section determined by said determining means and for canceling the selected page, whereby said page-in means registers the virtual page causing the page fault in the working set means.

2. A system according to claim 1, wherein said plurality of working set means includes a working set means which is specific to a code section of the task, a working set means which is specific to a data section of the task, and a working set means which is specific to a stack of the task.

3. A system according to claim 2, wherein a virtual space includes a code section virtual space, a data section virtual space, and a stack virtual space, and wherein said page-in means pages-in the virtual pages of the code section virtual space, the data section virtual space, and the stack virtual space in said code section working set means, said data section working set means, and said stack working set means, respectively.

4. A system according to claim 2, wherein said determining means determines the code section virtual space, the data section virtual space, or the stack virtual space to which a virtual page causing a page fault belongs.

5. A system according to claim 1, wherein said plurality of working set means is divided into a working set means for a control stack and a working set means for a data stack.

* * * * *